J. G. VINCENT.
METHOD OF WELDING.
APPLICATION FILED MAY 10, 1919.
1,361,936.
Patented Dec. 14, 1920
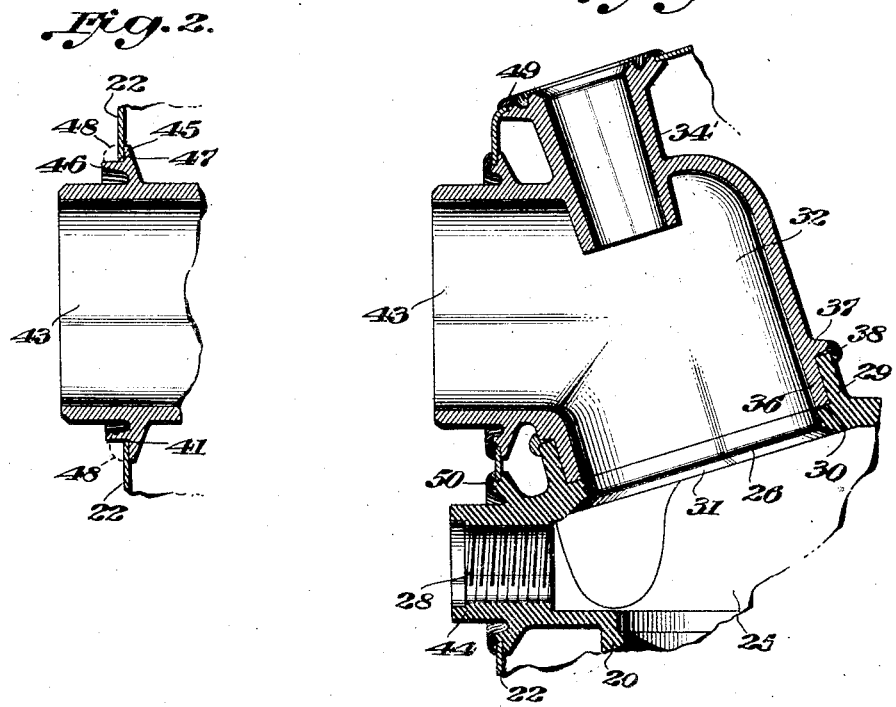
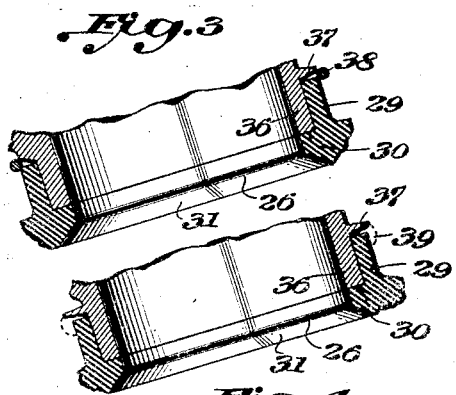
Inventor,
Jesse G. Vincent,
By Milton Tibbetts,
Atty

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

METHOD OF WELDING.

1,361,936.   Specification of Letters Patent.   Patented Dec. 14, 1920.

Original application filed July 30, 1917, Serial No. 183,587. Divided and this application filed May 10, 1919. Serial No. 296,373.

*To all whom it may concern:*

Be it known that I, JESSE G. VINCENT, a citizen of the United States, and resident of Detroit, Wayne county, State of Michigan, have invented certain new and useful Improvements in Methods of Welding, of which the following is a specification.

This application is a division of my application Serial No. 183,587 filed July 30, 1917, patented November 18, 1919, No. 1,321,866.

This invention relates to the making of motor cylinders and particularly to the forming of cylinder blocks and to connecting various parts of built up cylinders.

One of the objects of the invention is to connect metal parts by a novel method or process.

Another object of the invention is to build up a motor cylinder by a novel method.

Other objects of the invention will appear from the following description, taken together with the drawings which form a part of this specification, and in which:—

Figure 1 is a sectional view through a portion of a motor cylinder made in accordance with this invention;

Fig. 2 is a fragmentary sectional view of parts of the cylinder elbow and water jacket shown in Fig. 1, illustrating the form of the parts before the welding has been effected;

Fig. 3 is a fragmentary view of the contiguous parts of the cylinder and elbow, showing the form of the parts before the welding of them together has been effected; and Fig. 4 is similar to Fig. 3 except for a slight change in formation of the parts.

Referring to the drawings, the motor cylinder 20 is preferably made of a steel forging machined both inside and outside, with a compression space 25 at its upper or inner end and with inlet and outlet ports, one of which is shown at 26, and with a spark plug port 28 communicating with the compression space. The cylinder at the port 26, is extended slightly beyond the port in the form of a tubular part 29, and an internal shoulder 30, spaced from the end of the tubular part and adjacent to valve seat portion 31 of the port, is formed during the machining operation.

An elbow-like part 32 is secured to the cylinder proper at the port 26 to form the intake or exhaust passage for the motor. Such elbow 32 has a tubular part 36 formed to fit within the tubular part 29 of the cylinder proper and to have its end abut against the shoulder 30, and an external flange 37 is formed on the elbow, and when the parts are placed together, as shown in Fig. 1, said flange 37 is adjacent to the end of the tubular part 29. As shown, the flange 37 is slightly tapered so there is not a close fit between it and the end of the tubular part 29, and for the purpose of making a welded joint between these two parts a piece of wire 38 is placed around the loose joint and a welding heat is applied to the wire and to the adjacent parts of the tubes and the wire and the adjacent parts are thereby fused together. The resulting welded joint is shown in Fig. 1.

Fig. 4 shows the same arrangement of tubular parts, but in this case the wire 38 is omitted and in forming the joint a welding heat is applied directly to the flange 37 (which in its formation was changed slightly from the form shown in Figs. 1 and 3), and to the end of the tubular part 29 so that these two parts are directly joined together. The joint is shown in dotted lines at 39.

The cylinder and elbow above referred to are formed with an upwardly projecting boss 34', with a projecting end 43 on the elbow, and with a boss 44 in which the spark plug port 28, above referred to, is arranged. A jacket 22, preferably of sheet steel, is secured to these three parts of the motor cylinder by a novel welding method which will now be described. Since the method of connecting the jacket to each of these three parts is the same, only one connection will be described in detail.

The tubular part 43 of the elbow 32 is shown in section in Figs. 1 and 2. In Fig. 2 it will be seen that this tubular part of the elbow has an external flange 45 machined on it and on the flange is a rim or ring 46 which is substantially the thickness of the sheet metal water jacket to which it is to be connected. This ring 46 is separated from and parallel to the outer wall of the tube and it is so arranged on the flange 45 as to leave part of that flange extending beyond the ring to form a shoulder 47. The water jacket 22 is now placed around the cylinder and the tubular part 43 of the elbow and its ring 46 are inserted through the opening 41 so that the jacket rests against the base of the ring 46 and the shoulder 47 formed by the extended part of the flange 45. A welding heat is now applied to the ring 46 and the adjacent part of the jacket 22 so that these metal parts flow together and form a welded joint. This joint is indicated in dotted lines at 48. Similar joints are made at 49 and 50 as shown in Fig. 1.

It will be understood that modifications may be made in the above described method without departing from the spirit or scope of the invention.

Having thus described my invention, what I claim and desire to secure by Letters Patent is:—

1. A method of welding a piece of sheet metal having an opening therethrough to a piece of metal adapted to extend through and practically fill said opening, consisting in forming the inner piece with an external flange and with a ring on said flange arranged parallel with and separated from the outer wall of the piece with the flange extending beyond the ring to form a shoulder then inserting said inner piece through said opening with the sheet metal against said shoulder and surrounding said ring, and then, while the surface of the sheet metal next adjacent is exposed, heating said ring and the adjacent sheet metal piece and effecting a weld between them.

2. A method of welding a piece of sheet metal to a tube consisting in forming the tube with an external circumferential flange and with a ring on the flange separated from and parallel to the outer wall of the tube leaving part of the flange extending beyond the ring to form a shoulder, cutting away the sheet metal to fit it over said ring and against said shoulder, and heating said ring and the adjacent sheet metal while the surface of the latter next adjacent the ring is exposed and effecting a weld between them.

3. A method of welding a piece of sheet metal to a tube consisting in forming the tube with an external flange and with a ring on the flange of substantially the thickness of the sheet metal and separated from and parallel to the outer wall of the tube leaving part of the flange extending beyond the ring to form a shoulder, cutting a hole in the sheet metal and fitting it over said ring and against said shoulder, and heating said ring and the adjacent sheet metal to cause them to flow together.

4. A method of uniting two pieces of metal of different thicknesses consisting in forming the thicker piece with a flange extending laterally from its wall and with a rim on said flange arranged parallel with and separated from the wall of the piece with the flange extending beyond the rim to form a shoulder, then placing the thinner piece normal to the wall of the thicker piece and against said shoulder and with its edge against the outer surface of said rim, and then, while part of the outer surface of said rim and the surface of the thinner piece next adjacent thereto are both exposed, heating said rim and adjacent parts of the thinner piece and effecting a weld between them.

5. A method of uniting two pieces of metal of different thicknesses consisting in forming the thicker piece with a flange extending laterally from its wall and with a rim on said flange arranged parallel with and separated from the wall of the piece with the flange extending beyond the rim to form a shoulder, then placing the thinner piece normal to the wall of the thicker piece and against said shoulder and with its edge against the outer surface of said rim, and then, while the edge of said rim and the surface of the thinner piece next adjacent to the rim are both exposed, heating said rim and adjacent parts of the thinner piece and effecting a weld between them.

6. A method of welding a piece of sheet metal to a tube consisting in forming the tube with an external flange and with a ring on the flange separated from and parallel to the outer wall of the tube leaving part of the flange extending beyond the ring to form a shoulder, the ring and the part of the flange extending beyond it being of substantially the thickness of the sheet metal, fitting said sheet metal over said ring and against said shoulder, and heating the adjacent parts of the flange and sheet metal to cause them to flow together.

In testimony whereof I affix my signature.

JESSE G. VINCENT.